United States Patent
Sheu et al.

(10) Patent No.: US 12,373,882 B2
(45) Date of Patent: Jul. 29, 2025

(54) PROVIDING AN ITEM IMAGE

(71) Applicant: eBay Inc., San Jose, CA (US)

(72) Inventors: Jack Sheu, Mountain View, CA (US); Charles F. Pletcher, Los Altos, CA (US); Selina Lam, Castro Valley, CA (US)

(73) Assignee: eBay Inc., San Jose, CA (US)

( * ) Notice: Subject to any disclaimer, the term of this patent is extended or adjusted under 35 U.S.C. 154(b) by 408 days.

(21) Appl. No.: 17/501,660

(22) Filed: Oct. 14, 2021

(65) Prior Publication Data

US 2022/0036441 A1 Feb. 3, 2022

Related U.S. Application Data

(63) Continuation of application No. 16/433,866, filed on Jun. 6, 2019, now Pat. No. 11,182,846, which is a continuation of application No. 15/644,102, filed on Jul. 7, 2017, now Pat. No. 10,354,318, which is a continuation of application No. 13/367,936, filed on Feb. 7, 2012, now Pat. No. 9,704,191, which is a continuation of application No. 12/963,287, filed on Dec. 8, 2010, now Pat. No. 9,767,509.

(51) Int. Cl.
*G06Q 30/00* (2023.01)
*G06Q 30/0251* (2023.01)
*G06Q 30/0601* (2023.01)

(52) U.S. Cl.
CPC ..... *G06Q 30/0643* (2013.01); *G06Q 30/0251* (2013.01); *G06Q 30/0259* (2013.01); *G06Q 30/0261* (2013.01); *G06Q 30/0625* (2013.01)

(58) Field of Classification Search
CPC .......... G06Q 30/0643; G06Q 30/0261; G06Q 30/0251
See application file for complete search history.

(56) References Cited

U.S. PATENT DOCUMENTS 8,737,974 B1   5/2014   Sennett et al.
9,704,191 B2   7/2017   Sheu et al.
(Continued)

OTHER PUBLICATIONS

Shugan, S. M. (2004). The impact of advancing technology on marketing and academic research. Marketing Science, 23(4), 469-475. Retrieved from http://search.proquest.com/docview/212264375?accountid=14753.*

(Continued)

*Primary Examiner* — Kathleen Palavecino
(74) *Attorney, Agent, or Firm* — Shook Hardy & Bacon L.L.P.

(57) ABSTRACT

A first device captures an image of an item and provides the image depicting the item, information usable to direct an electronic communication to the first device, and a textual descriptor to a host machine. The host machine is accessible by a second device. The first device receives an electronic communication from the second device regarding the image based on the information usable to direct the electronic communication to the first device that is associated with the image. The image is identifiable by the second device based on a tag for the image selected by the host machine based on the textual information. The communication is received by the first device based on a location of the first device relative to a location of the second device.

17 Claims, 7 Drawing Sheets

(56) References Cited

U.S. PATENT DOCUMENTS

| | | | |
|---|---|---|---|
| 9,715,701 | B2 | 7/2017 | Law et al. |
| 9,767,509 | B2 | 9/2017 | Sheu et al. |
| 10,354,318 | B2 | 7/2019 | Sheu et al. |
| 11,182,846 | B2 | 11/2021 | Sheu et al. |
| 2001/0029465 | A1* | 10/2001 | Strisower .......... G06Q 30/0251 705/14.49 |
| 2002/0002509 | A1 | 1/2002 | Wagorn et al. |
| 2004/0137886 | A1 | 7/2004 | Ross et al. |
| 2005/0010484 | A1 | 1/2005 | Bohannon et al. |
| 2005/0160014 | A1 | 7/2005 | Moss et al. |
| 2006/0069623 | A1 | 3/2006 | Macdonald et al. |
| 2007/0078722 | A1 | 4/2007 | Saxena et al. |
| 2007/0078726 | A1 | 4/2007 | Macdonald et al. |
| 2007/0219858 | A1 | 9/2007 | Seymour et al. |
| 2007/0260591 | A1 | 11/2007 | Ahi et al. |
| 2008/0010156 | A1 | 1/2008 | Coudron |
| 2008/0078859 | A1 | 4/2008 | Turner |
| 2008/0097859 | A1 | 4/2008 | Schrenk |
| 2008/0154706 | A1 | 6/2008 | Bruecken |
| 2008/0235148 | A1* | 9/2008 | Liu ....................... G06Q 30/00 707/999.005 |
| 2008/0288338 | A1* | 11/2008 | Wiseman .......... G06Q 30/0277 705/14.69 |
| 2009/0012878 | A1 | 1/2009 | Tedesco et al. |
| 2009/0150258 | A1 | 6/2009 | Nokes et al. |
| 2009/0248742 | A1 | 10/2009 | Krishnamurthy et al. |
| 2009/0271274 | A1 | 10/2009 | Baunach |
| 2009/0271290 | A1* | 10/2009 | Van Luchene ......... G06Q 20/10 705/26.1 |
| 2009/0313138 | A1 | 12/2009 | Ratnakar |
| 2010/0010907 | A1 | 1/2010 | Dasgupta |
| 2010/0131388 | A1 | 5/2010 | Law et al. |
| 2010/0217680 | A1 | 8/2010 | Fusz et al. |
| 2011/0035283 | A1 | 2/2011 | Min et al. |
| 2011/0045801 | A1 | 2/2011 | Parker |
| 2011/0099037 | A1 | 4/2011 | Levin et al. |
| 2011/0270717 | A1 | 11/2011 | Macdonald et al. |
| 2011/0302096 | A1 | 12/2011 | Lowry |
| 2012/0150652 | A1 | 6/2012 | Sheu et al. |
| 2012/0150696 | A1 | 6/2012 | Sheu et al. |
| 2017/0308951 | A1 | 10/2017 | Sheu et al. |
| 2019/0325510 | A1 | 10/2019 | Sheu et al. |

OTHER PUBLICATIONS

Final Office Action received for U.S. Appl. No. 12/963,287, mailed on Jul. 29, 2013, 33 pages.
Final Office Action received for U.S. Appl. No. 12/963,287, mailed on Oct. 16, 2015, 37 pages.
Non-Final Office Action received for U.S. Appl. No. 12/963,287, mailed on Feb. 21, 2013, 31 pages.
Non-Final Office Action received for U.S. Appl. No. 12/963,287, mailed on Mar. 26, 2015, 34 pages.
Non-Final Office Action received for U.S. Appl. No. 12/963,287, mailed on Nov. 2, 2016, 41 pages.
Non-Final Office Action received for U.S. Appl. No. 12/963,287, mailed on Oct. 17, 2012, 34 pages.
Notice of Allowance received for U.S. Appl. No. 12/963,287, mailed on May 11, 2017, 17 pages.
Advisory Action received for U.S. Appl. No. 13/367,936, mailed on Jan. 22, 2013, 3 pages.
Appeal Decision received for U.S. Appl. No. 13/367,936, mailed on Oct. 21, 2015, 6 pages.
Decision on Pre-Appeal Brief Request received for U.S. Appl. No. 13/367,936, mailed on Mar. 11, 2013, 2 pages.
Examiner's Answer to Appeal Brief received for U.S. Appl. No. 13/367,936, mailed on Jun. 7, 2013, 5 pages.
Final Office Action received for U.S. Appl. No. 13/367,936, mailed on Dec. 1, 2016, 10 pages.
Final Office Action received for U.S. Appl. No. 13/367,936, mailed on Nov. 21, 2012, 24 pages.
Non-Final Office Action received for U.S. Appl. No. 13/367,936, mailed on May 27, 2016, 27 pages.
Non-Final Office Action received for U.S. Appl. No. 13/367,936, mailed on Jun. 7, 2012, 23 pages.
Notice of Allowance received for U.S. Appl. No. 13/367,936, mailed on Mar. 9, 2017, 14 pages.
Notice of Allowance received for U.S. Appl. No. 15/644,102, mailed on Mar. 6, 2019, 11 pages.
Shugan, "The Impact of Advancing Technology on Marketing and Academic Research", Marketing Science, 23(4), 469-475. Retrieved from the Internet URL :<http://search.proquest.com/docview/212264375?accountid=14753>, 2004, pp. 469-475.
U.S. Appl. No. 16/433,866, filed Jun. 6, 2019, Issued.
U.S. Appl. No. 15/644,102, filed Jul. 7, 2017, Issued.
U.S. Appl. No. 13/367,936, filed Feb. 7, 2012, Issued.
U.S. Appl. No. 12/963,287, filed Dec. 8, 2010, Issued.
Corrected Notice of Allowability received for U.S. Appl. No. 16/433,866, mailed on Aug. 11, 2021, 4 pages.
Final Office Action received for U.S. Appl. No. 16/433,866, mailed on Jan. 12, 2021, 18 pages.
Final Office Action received for U.S. Appl. No. 16/433,866 mailed on Feb. 2, 2021, 17 pages.
Non Final Office Action received for U.S. Appl. No. 16/433,866, mailed on Mar. 25, 2021, 19 pages.
Non Final Office Action received for U.S. Appl. No. 16/433,866, mailed on Sep. 29, 2020, 18 pages.
Notice of Allowance received for U.S. Appl. No. 16/433,866, mailed on Aug. 3, 2021, 13 pages.

* cited by examiner

PROVIDING AN ITEM IMAGE

CROSS-REFERENCE TO RELATED APPLICATIONS

This patent application is a continuation of U.S. patent application Ser. No. 16/433,866, filed Jun. 6, 2019, which is a continuation of Ser. No. 15/644,102, filed Jul. 7, 2017 (issued as U.S. Pat. No. 10,354,318), which is a continuation of U.S. patent application Ser. No. 13/367,936, filed on Feb. 7, 2012 (issued as U.S. Pat. No. 9,704,191), which is a continuation of U.S. patent application Ser. No. 12/963,287, filed on Dec. 8, 2010 (issued as U.S. Pat. No. 9,767,509). Each of the aforementioned is incorporated herein by reference in its entirety.

TECHNICAL FIELD

The subject matter disclosed herein generally relates to the processing of data. Specifically, the present disclosure addresses systems and methods of providing an image of an item to advertise the item.

BACKGROUND

For the purpose of merchandising a product or an item, a machine may present an advertisement to a user of the machine. For example, a web server may insert a banner ad (e.g., an advertisement shaped like a banner) into a web page before providing the web page to a web client for presentation to a user, where the banner ad is an advertisement for an item. The banner ad may be provided to the web server by a manufacturer of a product, and the web server may, for a fee, cause the banner ad to be presented to one or more users who view the web page. As another example, the web server may allow a seller of an item to write a description of the item and publish the description as a web page that advertises the item as being available for purchase. The item may be a particular instance of a product being merchandised.

BRIEF DESCRIPTION OF THE DRAWINGS

Some embodiments are illustrated by way of example and not limitation in the figures of the accompanying drawings in which.

DETAILED DESCRIPTION

Figure 1:
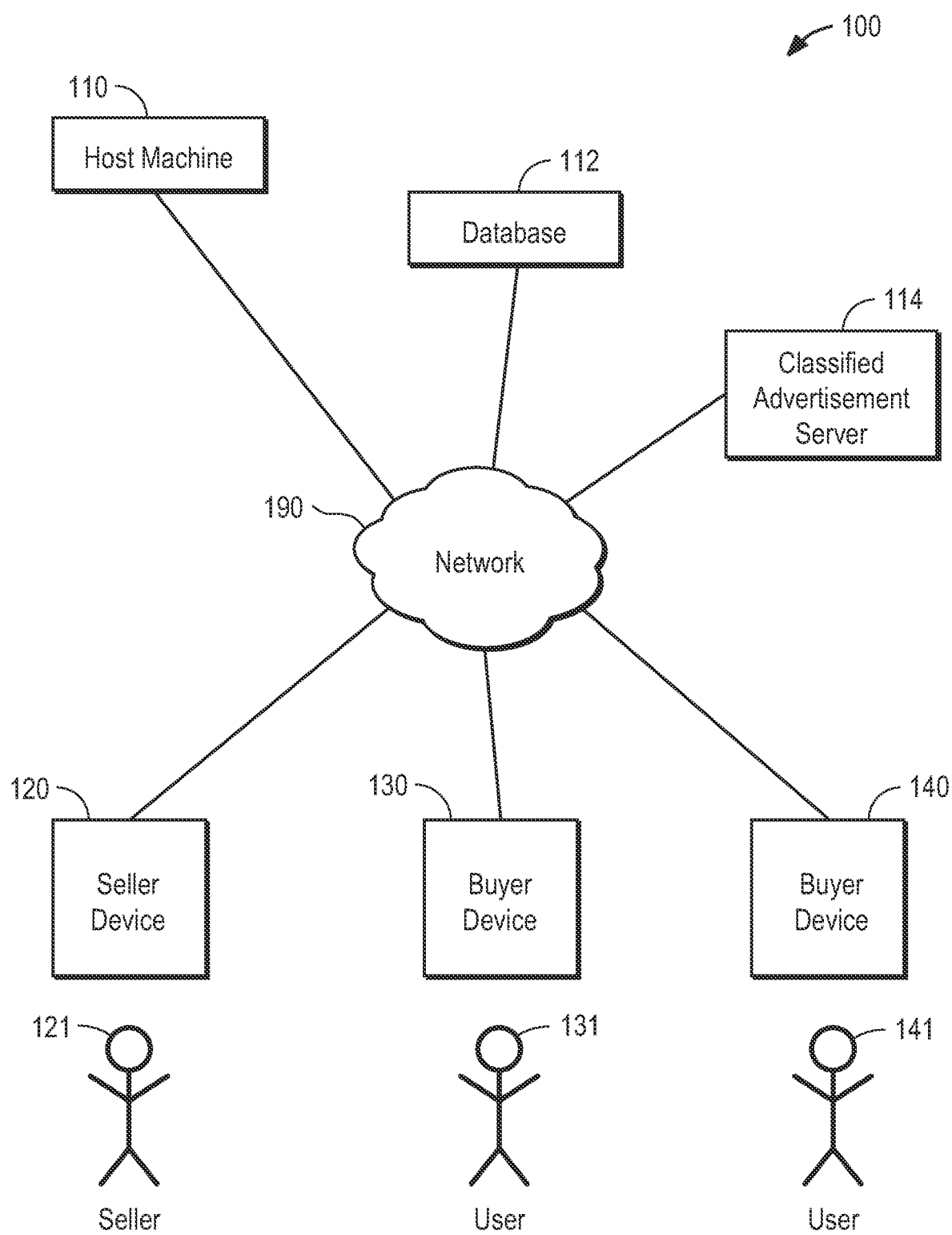
FIG. 1 is a diagram of a network environment suitable for providing an image of an item to advertise the item, according to some example embodiments.

Example methods and systems are directed to providing an image of an item as an advertisement for that item. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

At times, sellers of items may desire a convenient way to quickly create and distribute an advertisement for an item. A convenient way to do this is to enable a seller's cameraphone or other camera-enabled device to take a photograph of an item and upload the resulting image, with an address of the seller, to an advertisement server (e.g., a classified advertisement server). In particular, a software module (e.g., a seller module) may be provided to a mobile device of the seller that causes the device to capture or generate an image of the item and transmit the image with the address of the seller to the advertisement server. Although descriptive information (e.g., a caption, a title, or a tag) about the item may be written by the seller and associated with the photograph, such written information (e.g., a textual descriptor) is not necessary for quickly advertising the item as being available for purchase. The seller may rely on the photograph alone to initially convey details about the item and allow a potential buyer to initiate contact using the address of the seller. In other words, from the seller's perspective, the image itself may function as an advertisement for the item (e.g., sufficient to invite a communication from a potential buyer).

Similarly, potential buyers of items may desire a convenient way to visually scan through advertisements for items and initiate a request for information about a particular item. A convenient way to do this is to enable a potential buyer's mobile phone, portable music player, or other device to receive a photograph that depicts an item and, upon request, initiate a communication to the seller of the item. In particular, a software module (e.g., a buyer module) may be provided to a mobile device of the buyer that causes the device to receive and present an image depicting the item and, in response to a communication request by the potential buyer, direct a communication to the seller of the item. Although descriptive information (e.g., caption, title, or a tag) about the item may be presented with the photograph, a potential buyer need not search for, or read, any written information (e.g., a textual descriptor) in deciding to contact a seller for more information about the item depicted in the photograph. The potential buyer may rely on the photograph alone to initially present details about the item and may utilize the seller's address to initiate contact with the seller. In other words, from the potential buyer's perspective, the image itself may suffice as an advertisement for the item (e.g., sufficient to decide whether to initiate a communication with the seller of the item).

A host machine (e.g., a server system) may be configured using one or more software modules to facilitate reception of images captured by mobile devices and provision of those images as advertisements for items depicted therein. A software module for seller devices (e.g., seller module) and a software module for buyer devices (e.g., buyer module) may be respectively provided to a seller device and to a buyer device by the host machine (e.g., as downloadable data). Such software modules may take the form of, for example, a computer program, an application, an applet, an "app" for a mobile device, or any suitable combination thereof. In some example embodiments, the host machine also communicates the image of the item to an advertisement server (e.g., a classified ad server), which publishes the image as an advertisement of the item on a web page (e.g., within a classified ad web site).

The seller device executes the seller module. While the seller module is being executed by the seller device, the host machine may receive the image of the item, as well as a seller address (e.g., email address) of the seller of the item, from the seller module. As used herein, a "seller address" is an address usable to direct a communication to the seller. The seller address may be provided by the host machine to the buyer device for use in initiating contact with the seller.

The buyer device executes the buyer module. While the buyer module is being executed by the buyer device, the host machine may provide the image of the item, as well as the seller address, to the buyer module for use in initiating contact with the seller of the item.

According to various example embodiments, the host machine may receive and provide one or more textual descriptors for a particular image. For example, the host machine may receive a textual descriptor generated at the seller device and provide the same textual descriptor to a buyer device. As another example, the host machine may select a different textual descriptor, based on the textual descriptor provided by the seller device, and provide the different textual descriptor to the buyer device.

Similarly, the host machine may receive a price of the item from the seller module and provide the price of the item to the buyer module. In some example embodiments, the host machine may select a different price, based on the price provided by the seller device, and provide the different price to the buyer device.

Moreover, the host machine may receive location information (e.g., global positioning system (GPS) coordinates) from the seller module and from the buyer module, respectively, and provide the image of the item based on the location information received. For example, the host machine may determine that the seller device and the buyer device are sufficiently close geographically (e.g., both physically located in the same state, city, or neighborhood) and provide the image of the item to the buyer module based on that determination. This may have the effect of increasing the likelihood that a seller and a potential buyer will discuss a purchase of the item, complete a purchase of the item, transfer the item, or any suitable combination thereof.

FIG. 1 is a diagram of a network environment 100 suitable for providing an image of an item to advertise the item, according to some example embodiments. The network environment 100 includes a host machine 110, a database 112, a classified advertisement server 114, buyer devices 130 and 140, and a seller device 120, all communicatively coupled to each other via a network 190.

The host machine 110 may be a server system (e.g., web server system or application server system) that is configured to communicate with the seller device 120 and the buyer devices 130 and 140. In particular, the host machine 110 is configured to communicate with seller software (e.g., a seller module) executing on the seller device 120 and with buyer software (e.g., buyer module) executing on the buyer device 130, the buyer device 140, or both.

The database 112 is configured to store information (e.g., an image of an item, a seller address, a location of the seller device 120, or the location of the buyer device 130) received by the host machine 110 or to be provided by the host machine 110. The classified advertisement server 114 is configured to publish an advertisement of the item (e.g., a further advertisement) based on the image of the item. In some example embodiments, the classified advertisement server 114 is a network-based publication system, listing system, transaction system, shopping system, purchasing system, auction system, or any suitable combination thereof.

The classified advertisement server 114 is configured to publish one or more listings of items. For example, the classified advertisement server 114 may be configured to publish a listing of an item, where the listing of the item may span one or more web pages. As published, a listing of an item may function as an advertisement for that item. In some example embodiments, the classified advertisement server 114 is configured to publish an image of the item as a listing of the item. Moreover, the classified advertisement server 114 may organize multiple listings into one or more classifications (e.g., categories).

Also shown in FIG. 1 are a seller 121 and users 131 and 141. The seller 121 corresponds to the seller device 120. For example, the seller device 120 may be a camera-enabled phone (e.g., a mobile phone with a built-in camera) used by the seller. The user 131 corresponds to the buyer device 130, and the user 131 is a potential buyer of an item available for purchase from the seller 121. Likewise, the user 141 corresponds to the buyer device 140, and the user 141 is a potential buyer of the item available for purchase from the seller 121. One or more of the seller 121 and the users 131 and 141 may be a human user (e.g., a human being), a machine user (e.g., software program to interact with a client device), or any suitable combination thereof.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 12. As used herein, a "database" is a data storage resource and may store data structured as a text file, a table, a spreadsheet, a relational database, a triple store, or any suitable combination thereof. Moreover, any two or more of the machines illustrated in FIG. 1 may be combined into a single machine, and the functions described herein for any single machine may be subdivided among multiple machines.

The network 190 may be any network that enables communication between machines (e.g., host machine 110 and seller device 120). Accordingly, the network 190 may be a wired network, a wireless network, or any suitable combination thereof. The network 190 may include one or more portions that constitute a private network, a public network (e.g., the Internet), or any suitable combination thereof.

Figure 2:
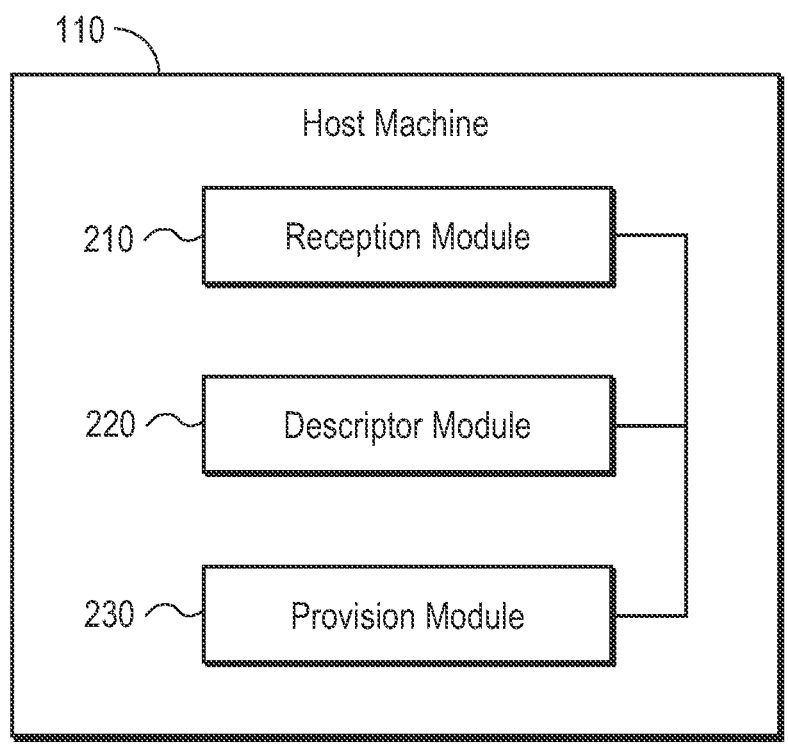
FIG. 2 is a block diagram of a host machine, according to some example embodiments.

FIG. 2 is a block diagram of the host machine 110, according to some example embodiments. The host machine 110 includes a reception module 210, a descriptor module 220, and a provision module 230, all configured to communicate with each other (e.g., via a bus, a shared memory, or a switch). Any one or more of these modules may be implemented using hardware (e.g., a processor of a machine) or a combination of hardware and software. Moreover, any two or more of these modules may be combined into a single module, and the functions described herein for a single module may be subdivided among multiple modules.

The reception module 210 is configured to receive an image from a seller module being executed at the seller device 120. The image depicts an item available for purchase from the seller 121, and the image is generated by the seller device 120. For example, the seller device 120 may use a built-in camera to take a photograph of the item (e.g., optically capture light reflected from the item and represent that light as a digital image). The reception module 210 may receive the image as an advertisement of the item (e.g., as the entirety of the advertisement of the item). In other words, the reception module 210 may receive the advertisement by receiving the image.

The image corresponds to a seller address (e.g., an address of the seller 121), and the seller address is usable to direct a communication to the seller 121. As examples, the seller address may be an email address of the seller 121, a phone number of the seller 121, an instant messaging address of the seller 121, a text messaging address of the seller 121, a social network username of the seller 121, or any combination thereof. In some example embodiments, the reception module 210 is configured to receive the seller address, as well as receive other information as described below with respect to FIGS. 5-7 and 9-10.

The descriptor module 220 is configured to determine a textual descriptor based on another textual descriptor. As used herein, a "textual descriptor" is written information (e.g., words, phrases, numbers, or punctuation) that describes the item available for purchase from the seller 121. Examples of textual descriptors include a title of the image, a caption for the image, a description of the item, a keyword associated with the item, a tag corresponding to the item, a price of the item, a quantity of the item, or any suitable combination thereof. In particular, where the reception module 210 receives a first textual descriptor of the item, the descriptor module 220 is configured to determine a second textual descriptor of the item, based on the first textual descriptor.

The provision module 230 is configured to provide the image of the item and the seller address to a buyer module being executed at the buyer device 130. The buyer module is configured to display the image at the buyer device 130. Moreover, the buyer module may be configured to display the image as an advertisement of the item available for purchase from the seller 121. Accordingly, the provision module 230 may provide the image as the advertisement of the item (e.g., as the entirety of the advertisement of the item). In other words, the provision module 230 may provide an advertisement by providing the image.

The provision module 230 may provide the image of the item to the buyer module based on location information of the seller module (e.g., first location information), on location information of the buyer module (e.g., second location information), or any suitable combination thereof. In some example embodiments, the provision module 230 may provide one or more textual descriptors that describe the item, the image of the item, or both, as well as provide other information described below with respect to FIGS. 5 and 7-11.

Figure 3:
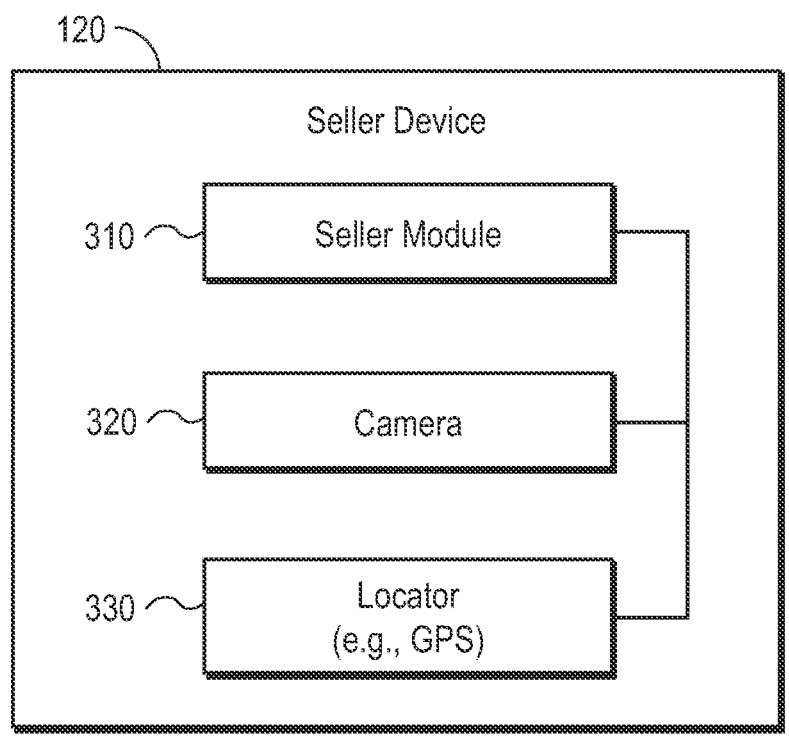
FIG. 3 is a block diagram of a seller device, according to some example embodiments.

FIG. 3 is a block diagram of the seller device 120, according to some example embodiments. The seller device 120 includes a seller module 310, a camera 320, and a locator 330, all configured to communicate with each other (e.g., via a bus, a shared memory, or a switch). Any one or more of these modules may be implemented using hardware (e.g., a processor of a machine) or a combination of hardware and software. Moreover, any two or more of these modules may be combined into a single module, and the functions described herein for a single module may be subdivided among multiple modules.

The seller module 310 is configured to execute on the seller device 120 and communicate with one or more modules of the host machine 110 (e.g., reception module 210). Executing on the seller device 120, the seller module 310 transmits the image of the item available for purchase from the seller 121 to the reception module 210 of the host machine 110.

The seller module 310 may be configured to initiate generation of the image of the item by the seller device 120. For example, the seller module 310 may trigger operation of the camera 320. Moreover, the seller module 310 may initiate generation of the image in response to a request from the seller 121 (e.g., entered by the seller 121 using a user interface of the seller device 120).

In some example embodiments, the seller module 310 may receive a seller address (e.g., an address of the seller 121), an identifier of the seller 121 (e.g., a username of the seller 121), an identifier of the seller device 120 (e.g., a unique device identifier (UDID)), or any suitable combination thereof. According to various example embodiments, the seller module 310 may process other information described below with respect to FIGS. 5-7 and 9.

The camera 320 is configured to capture an image and provide the image to the seller module 310. In particular, the camera 320 may capture the image of the item available for purchase from the seller 121, for example, by taking a digital photograph of the item. The camera 320 may be a built-in camera (e.g., enclosed within the seller device 120), an external camera (e.g., connected to the seller device 120), or any suitable combination thereof.

The locator 330 is configured to provide location information to the seller module 310. The location information indicates a location (e.g., a geographic location) of the seller device 120. The locator 330 may generate the location information (e.g., by triangulation), access the location information (e.g., from the database 112), or any suitable combination thereof. In some example embodiments, the locator 330 is configured to use Global Positioning System (GPS) data, and the locator 330 may be a GPS-enabled component of the seller device 120.

Figure 4:
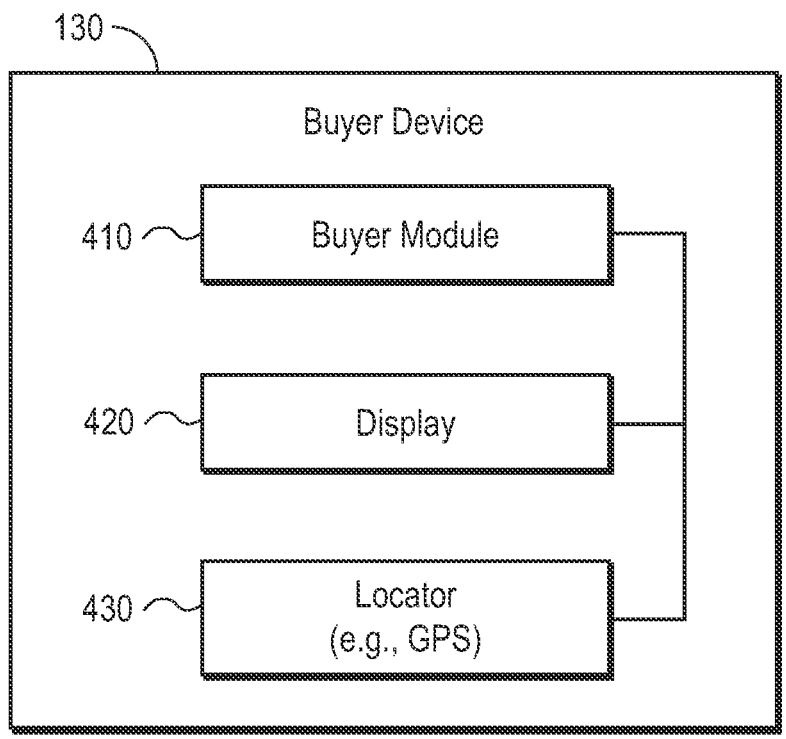
FIG. 4 is a block diagram of a buyer device, according to some example embodiments.

FIG. 4 is a block diagram of the buyer device 130, according to some example embodiments. The buyer device 130 includes a buyer module 410, a display 420, and a locator 430, all configured to communicate with each other (e.g., via a bus, a shared memory, or a switch). Any one or more of these modules may be implemented using hardware (e.g., a processor of a machine) or a combination of hardware and software. Moreover, any two or more of these modules may be combined into a single module, and the functions described herein for a single module may be subdivided among multiple modules.

The buyer module 410 is configured to execute on the buyer device 130 and communicate with one or more modules of the host machine 110 (e.g., provision module 230). Executing on the buyer device 130, the buyer module 410 receives the image of the item available for purchase from the seller 121 from the provision module 230 of the host machine 110. The buyer module 410 displays the image (e.g., via the display 420) at the buyer device 130. For example, the buyer module 410 may display the image at the buyer device 130 as an advertisement of the item available for purchase from the seller 121. In various example embodiments, the buyer module 410 may also display (e.g., via the display 420) information related to the image (e.g., a textual descriptor, a price, a seller address, location information of the seller device 120, or any suitable combination thereof).

The buyer module 410 may receive a seller address, an identifier of the seller 121, an identifier of the seller device 120, or any suitable combination thereof. According to various example embodiments, the buyer module 410 may process other information described below with respect to FIGS. 5 and 7-9.

The display 420 is configured to access the image of the item available for purchase from the seller 121 and display the image (e.g., to the user 131). For example, the display 420 may operate fully or partially under control of the buyer module 410 to display the image. The display 420 may utilize any type of display technology and may form all or part of a user interface for the seller device 120. Examples of the display 420 include a touchscreen, a projector, a computer screen, a flat-panel screen, a head-mounted display, a monitor, or any suitable combination thereof. Under full or partial control of the buyer module 410, the display 420 may also display information related to the image (e.g., a textual descriptor, a price, a seller address, location information of the seller device 120, or any suitable combination thereof).

The locator 430 is configured to provide location information to the buyer module 410. Location information includes a location (e.g., a geographic location) of the buyer device 130. The locator 430 may generate the location information (e.g., by triangulation), access the location information (e.g., from the database 112), or any suitable combination thereof. In some example embodiments, the locator 430 is configured to use GPS data, and the locator 430 may be a GPS-enabled component of the buyer device 130.

FIG. 5-11 are flowcharts illustrating methods 500, 600, 700, 800, 900, 1000, and 1100 of providing an image of an item to advertise the item, according to some example embodiments. Operations in the methods 500, 600, 700, 800, 900, 1000, and 1100 may be performed by the host machine 110, using one or more modules described above with respect to FIG. 2.

Figure 5:
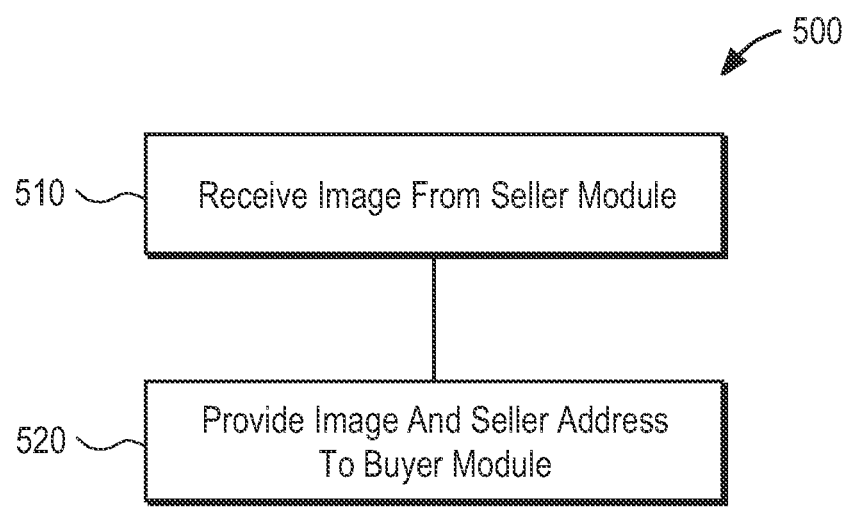
FIG. 5-11 are flowcharts illustrating methods of providing an image of an item to advertise the item, according to some example embodiments.

As shown in FIG. 5, the method 500 includes operations 510 and 520. In operation 510, the reception module 210 of the host machine 110 receives an image from the seller module 310, which is being executed at the seller device 120. The image depicts an item available for purchase from the seller 121, and the image is generated by the seller device 120 (e.g., by the camera 320). In some example embodiments, the receiving of the image is in response to generation of the image by the seller device 120 (e.g., by the seller module 310, the camera 320, or any suitable combination thereof). The image corresponds to a seller address (e.g., in matters of the seller 121). The seller address is usable to direct a communication to the seller 121 of the item.

In operation 520, the provision module 230 of the host machine 110 provides the image of the item and the seller address to the buyer module 410, which is being executed at the buyer device 130. As noted above, the buyer module 410 is configured to display the image of the item at the buyer device 130 (e.g., using the display 420) as an advertisement of the item.

Figure 6:
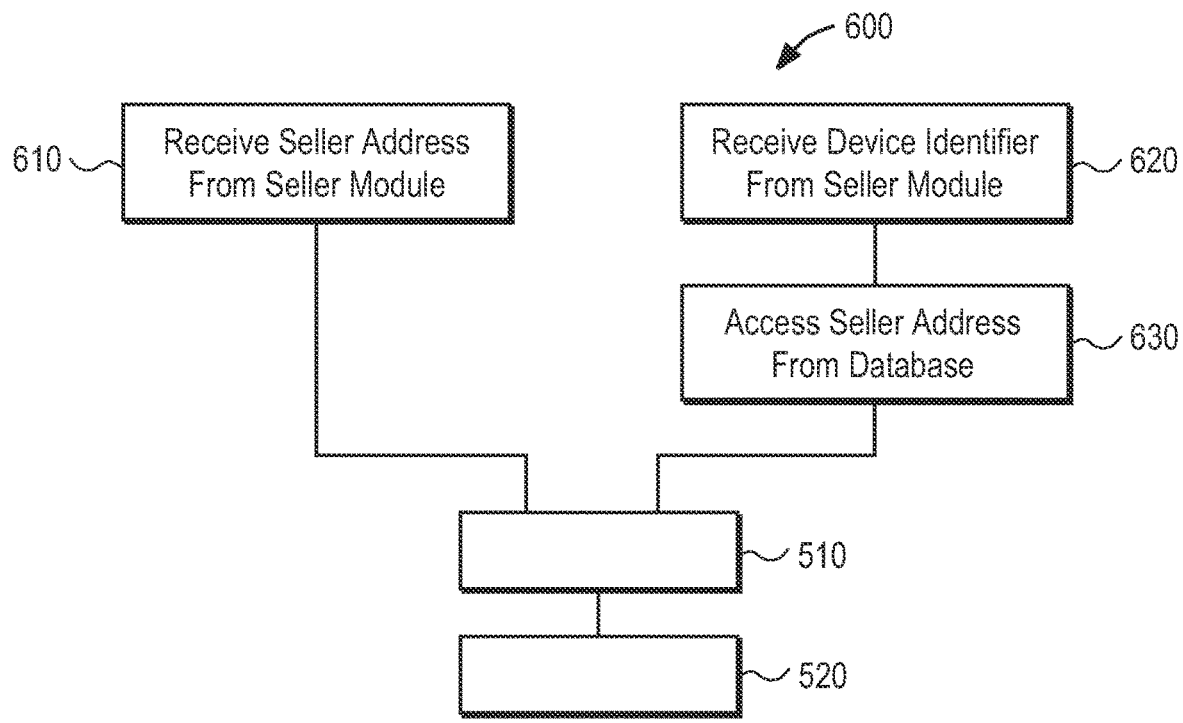

As shown in FIG. 6, the method 600 includes operations 610, 620, and 630, in addition to operations 510 and 520. Operations 510 and 520 are described above with respect to FIG. 5.

According to some example embodiments, the seller module 310 of the seller device 120 is further configured to receive the seller address. For example, the seller module 310 may receive the seller address as a submission to the seller device 120 from the seller 121 (e.g., entered by the seller 121 using a user interface of the seller device 120). Accordingly, the seller module 310 may transmit the seller address to the reception module 210 of the host machine 110. In operation 610, the reception module 210 of the host machine 110 receives the seller address from the seller module 310 of the seller device 120. This may have the effect of providing the provision module 230 with access to the seller address, which is provided to the buyer module 410 of the buyer device 130 in operation 520.

In various example embodiments, the seller module 310 of the seller device 120 is further configured to receive a device identifier (e.g., an identifier of the seller device 120). For example, the seller module 310 may receive the device identifier as a submission to the seller device 120 from the seller 121 (e.g., entered by the seller 121 using a user interface of the seller device 120). Accordingly, the seller module 310 may transmit the device identifier to the reception module 210 of the host machine 110. In operation 620, the reception module 210 of the host machine 110 receives the device identifier from the seller module 310 of the seller device 120. The device identifier corresponds to the seller address, and the correspondence relationship between the device identifier and the seller address to be stored in a database (e.g., database 112).

In operation 630, the reception module 210 accesses the seller address from the database 112, based on the device identifier received in operation 620. The database 112 stores one or more data records that correlate the device identifier to the seller address. For example, the database 112 may store a table that indicates an email address of the seller 121 as corresponding to a UDID of the seller device 120. This may have the effect of retrieving the seller address for use by the provision module 230 in operation 520.

Figure 7:
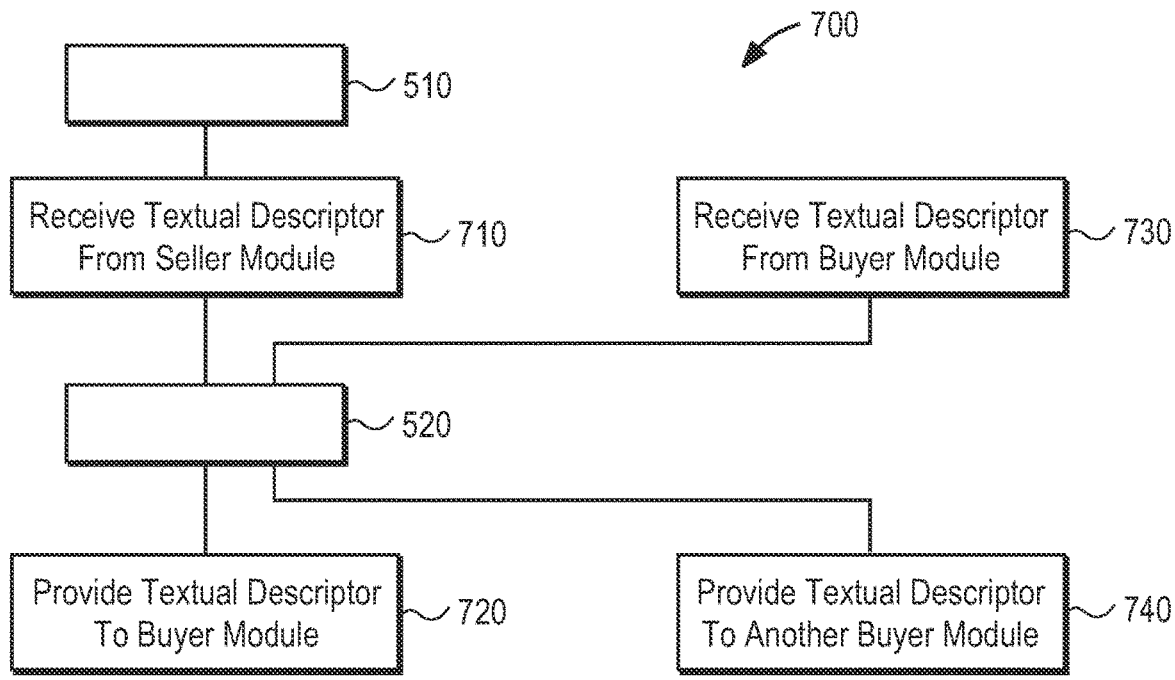

As shown in FIG. 7, the method 700 includes operations 710, 720, 730, and 740, in addition to operations 510 and 520. Operations 510 and 520 are described above with respect to FIG. 5.

According to various example embodiments, one or more textual descriptors may be received by the host machine 110 from the seller module 310 of the seller device 120, the buyer module 410 of the buyer device 130, or any suitable combination thereof. Similarly, one or more textual descriptors may be provided by the host machine 110 to the buyer module 410 of the buyer device 130, a buyer module of the buyer device 140, or any suitable combination thereof.

The seller module 310 of the seller device 120 may be configured to receive a textual descriptor of the item depicted in the image received by the reception module 210 of the host machine 110 in operation 510. For example, the seller module 310 may receive the textual descriptor as a submission to the seller device 120 from the seller 121 (e.g., entered by the seller 121 using a user interface of the seller device 120). Accordingly, the seller module 310 may transmit the textual descriptor to the reception module 210 of the host machine 110. In operation 710, the reception module 210 of the host machine 110 receives the textual descriptor from the seller module 310 of the seller device 120. This may have the effect of providing the provision module 230 with access to the textual descriptor.

In operation 720, the provision module 230 of the host machine 110 provides the textual descriptor to the buyer module 410 of the buyer device 130. The buyer module 410 may then display the textual descriptor (e.g., via the display 420) at the buyer device 130. For example, the buyer module 410 may display the textual descriptor with the image at the buyer device 130 as an advertisement of the item available for purchase from the seller 121. In certain example embodiments, the buyer module 410 performs operation 720 by initiating or controlling operation of the display 420.

According to some example embodiments, the information about the item depicted in the image may be obtained using crowd-sourcing techniques in which information about an item may be aggregated from one or more users (e.g., users 131 and 141).

Similar to the seller module 310 of the seller device 120, the buyer module 410 of the buyer device 130 may be configured receive a textual descriptor of the item. For example, the buyer module 410 may receive the textual descriptor as a submission to the buyer device 130 from the user 131 (e.g., entered by the user 131 using a user interface of the buyer device 130). Accordingly, the buyer module 410 may transmit the textual descriptor to the reception module 210 of the host machine 110. In operation 730, the reception module 210 of the host machine 110 receives the textual descriptor from the buyer module 410 of the buyer device 130. This may have the effect of providing the provision module 203 with access to the textual descriptor.

In operation 740, the provision module 230 of the host machine 110 provides the textual descriptor to another buyer module (e.g., a further buyer module) of another buyer device (e.g., a further buyer device). This may have the effect of allowing another user (e.g., user 141) of another buyer device (e.g., buyer device 140) to view the textual descriptor, as submitted by the user 131 at the buyer device 130.

Figure 8:
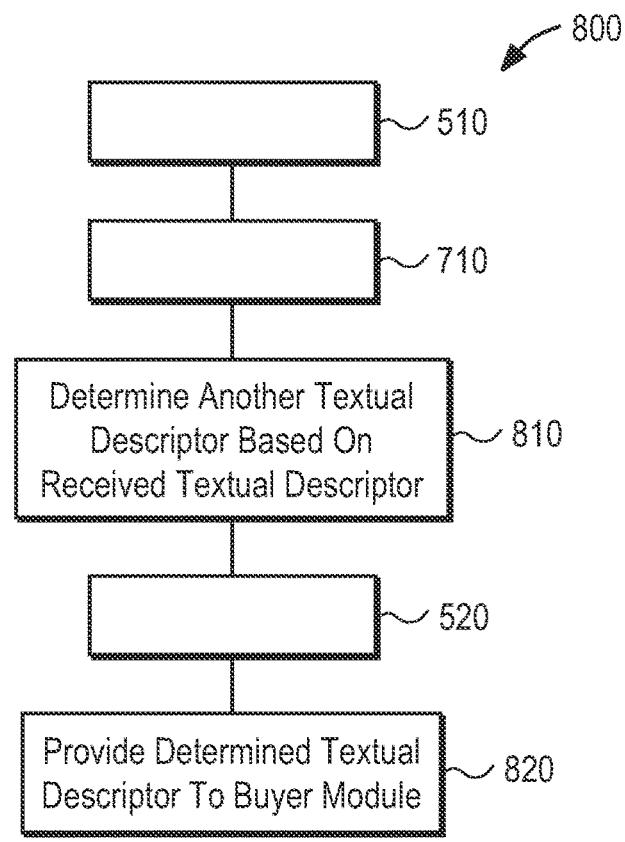

As shown in FIG. 8, the method 800 includes operations 810 and 820, in addition to operations 510, 710, and 520. Operations 510 and 520 are described above with respect to FIG. 5, and operation 710 is described above with respect to FIG. 7.

According to certain example embodiments, the seller module 310 of the seller device 120 may be configured to receive a first textual descriptor of the item depicted in the image (e.g., as a submission to the seller device 120 from the seller 121). Accordingly, the seller module 310 may transmit the first textual descriptor to the reception module 210 of the host machine 110, and the first textual descriptor may be received by the reception module 210 as described above with respect to operation 710.

In operation 810, the descriptor module 220 of the host machine 110 determines a second textual descriptor of the item depicted in the image, based on the first textual descriptor. For example, the descriptor module 220 may determine the second textual descriptor by selecting from a predefined list (e.g., of synonyms, related words, standard descriptors, supported tags, or any suitable combination thereof). Moreover, the descriptor module 220 may determine the second textual descriptor by accessing a database (e.g., database 112), an optical character recognizer, or both. This may have the effect of enabling the provision module 230 to replace or supplement the first textual descriptor with the second textual descriptor.

In operation 820, the provision module 230 of the host machine 110 provides the second textual descriptor of the item depicted in the image to the buyer module 410 of the buyer device 130. The buyer module 410 may then display the first textual descriptor, the second textual descriptor, or a combination thereof (e.g., via the display 420) at the buyer device 130. For example, the buyer module 410 may display the second textual descriptor with the image as an advertisement of the item available for purchase from the seller 121. The buyer module 410 may perform operation 820 by initiating or controlling operation of the display 420.

Figure 9:
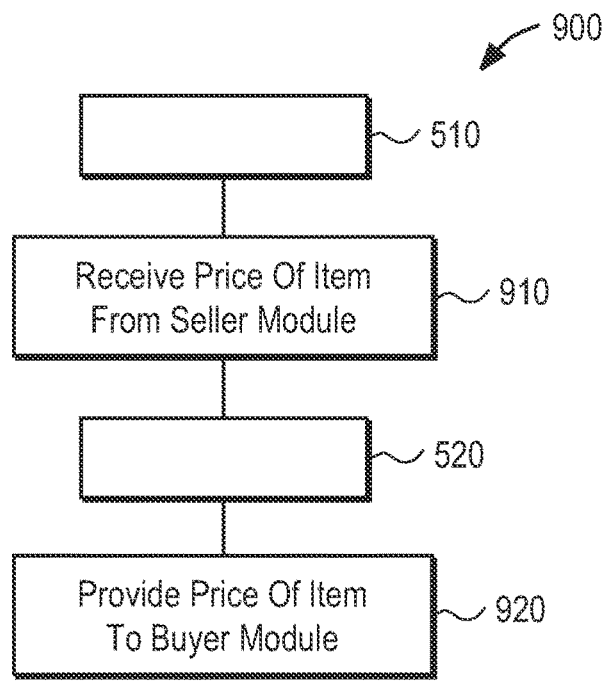

As shown in FIG. 9, the method 900 includes operations 910 and 920, in addition to operations 510 and 520. Operations 510 and 520 are described above with respect to FIG. 5.

In some example embodiments, the seller module 310 at the seller device 120 is configured to receive a price of the item depicted in the image. For example, the seller module 310 may receive the price as a submission to the seller device 120 from the seller 121. The price may be an amount of money (e.g., currency), a descriptive word or phrase (e.g., "free," "market price," or "best offer"), or any suitable combination thereof. Accordingly, the seller module 310 may transmit the price to the reception module 210 of the host machine 110. In operation 910, the reception module 210 of the host machine 110 receives the price from the seller module 310 of the seller device 120. This may have the effect of providing the provision module 203 with access to the price.

In operation 920, the provision module 230 of the host machine 110 provides the price to the buyer module 410 of the buyer device 130. The buyer module 410 may then display the price (e.g., by the display 420) at the buyer device 130. For example, the buyer module 410 may display the price with the image at the buyer device 130 as an advertisement of the item available for purchase from the seller 121. The buyer module 410 may perform operation 920 by initiating or controlling operation of the display 420.

Figure 10:
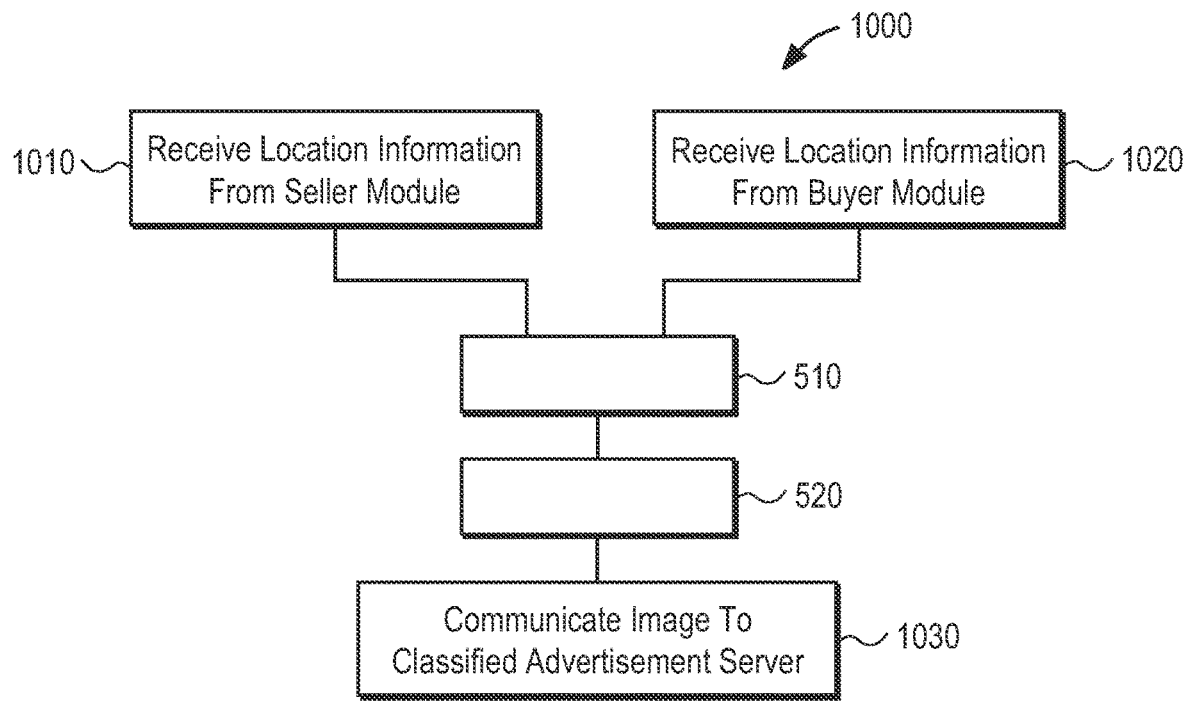

As shown in FIG. 10, the method 1000 includes operations 1010, 1020, and 1030, in addition to operations 510 and 520. Operations 510 and 520 are described above with respect to FIG. 5.

In certain example embodiments, the provision module 230 of the host machine 110 is configured to provide the image of the item to the buyer module 410 of the buyer device 130, based on location information. For example, the provision module 230 may provide the image of the item based on a determination that the buyer device 130 and the seller device 120 are geographically close to each other (e.g., in the same state, city, or neighborhood). This determination may include determining that a geographical distance between the buyer device 130 and the seller device 120 falls within a predetermined threshold distance. As another example, the provision module 230 may provide the image based on a determination that the buyer device 130 is at or near a geographical location specified by the seller 121. As a further example, the provision module 230 may provide the image based on a determination that the seller device 120 is at or near a geographical location specified by the user 131.

In operation 1010, the reception module 210 of the host machine 110 receives first location information from the seller module 310 of the seller device 120. The first location information indicates the location of the seller device 120 (e.g., a location that corresponds to the seller device 120). This may have the effect of providing the provision module 230 with access to the first location information.

In operation 1020, the reception module 210 of the host machine 110 receives second location information from the buyer module 410 of the buyer device 130. The second location information indicates the location of the buyer device 130 (e.g., a location that corresponds to the buyer device 130). This may have the effect of providing the provision module 230 with access to the second location information. Accordingly, the provision module 230 may perform operation 520 based on the first and second location information.

According to various example embodiments, the host machine 110 may communicate (e.g., transmit, post, or upload) the image of the item to an advertisement server (e.g., classified advertisement server 114). In operation 1030, the provision module 230 of the host machine 110 communicates the image of the item to the classified advertisement server 114. The classified advertisement server 114 is configured to publish a listing of the item based on the image communicated in operation 1030. For example, the classified advertisement server 114 may publish the image of the item as all or part of the listing of the item (e.g., on a web page). As noted above, the listing of the item may function as an advertisement (e.g., a classified ad) of the item. This may have the effect of advertising the item to users of the classified advertisement server 114 (e.g., beyond the users 131 and 141).

Figure 11:
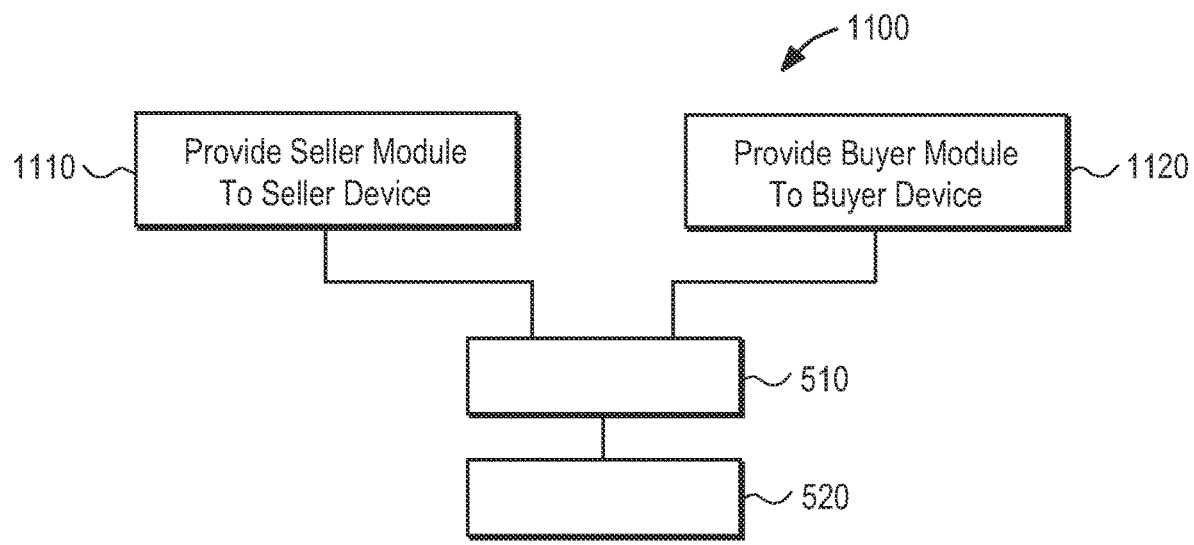

As shown in FIG. 11, the method 1100 includes operations 1110 and 1120, in addition to operations 510 and 520. Operations 510 and 520 are described above with respect to FIG. 5.

In certain example embodiments, the host machine 110 provides software (e.g., as modules) to one or more devices in the network environment 100 (e.g., seller device 120 or buyer device 130). For example, the host machine 110 may provide software as a downloadable application to a variety of mobile devices. As another example, the host machine 110 may provide the software as an update or upgrade of an application for the mobile devices.

In operation 1110, the provision module 230 of the host machine 110 provides the seller module 310 to the seller device 120, for execution by the seller device 120. The seller module 310 may be a new application, applet, or app for the seller device 120. Alternatively, the seller module 310 may be an upgrade or update of software already stored or executing at the seller device 120. Operation 1110 may be performed in response to a request for the seller module 310 (e.g., a download request). The request may be submitted by the seller 121 (e.g., entered using a user interface of the seller device 120). In some example embodiments, a fee is charged for use of the seller module 310, and the provision module 230 may initiate a transaction to charge the fee to the seller 121.

In operation 1120, the provision module 230 of the host machine 110 provides the buyer module 410 to the buyer device 130, for execution by the buyer device 130. The buyer module 410 may be a new application, applet, or app for the buyer device 130. Alternatively, the buyer module 410 may be an upgrade or update of software already stored or executing at the buyer device 130. Operation 1120 may be performed in response to a request for the buyer module 410 (e.g., a download request). The request may be submitted by the user 131 (e.g., entered using a user interface of the buyer device 130). In certain example embodiments, a fee is charged for use of the buyer module 410, and the provision module 230 may initiate a transaction to charge a fee to the user 131.

According to various example embodiments, one or more of the methodologies discussed herein may facilitate the merchandising of an item, for example, by providing an image of the item as an advertisement for that item. In particular, one or more of the methodologies described herein may constitute all or part of a business method (e.g., a business method implemented using a machine) that provides one or more users of a network-based system with a convenient way to browse and select items for potential purchase. Accordingly, one or more of the methodologies described herein may have the effect of increasing sales of a product, increasing a likelihood of a sale of a particular instance of a product, or both.

When these effects are considered in aggregate, one or more of the methodologies described herein may obviate a need for certain efforts or resources that otherwise would be involved in matching users (e.g., as potential participants in a purchase transaction) with products or items. Efforts expended by a seller in obtaining attention from potential buyers (e.g., users 131 and 141) may be reduced by one or more the methodologies described herein. Similarly, efforts expended by a user in identifying a product for purchase may be reduced by one or more of the methodologies described herein. Computing resources used by one or more machines, databases, or devices (e.g., within the network environment 100) may accordingly be reduced. Examples of such computing resources include processor cycles, network traffic, memory usage, data storage capacity, power consumption, and cooling capacity.

Figure 12:
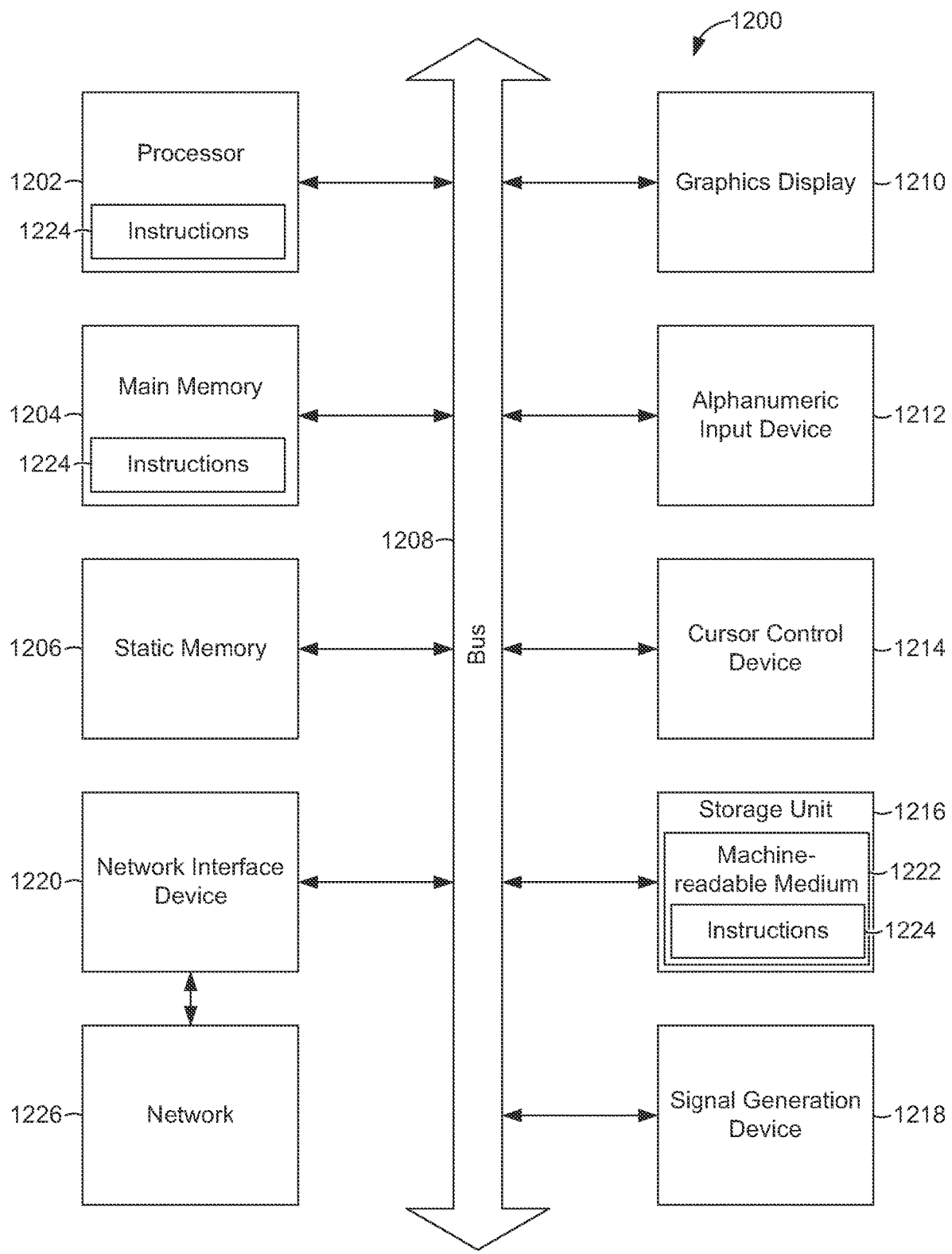
FIG. 12 is a block diagram illustrating components of a machine, according to some example embodiments, able to read instructions from a machine-readable medium and perform any one or more of the methodologies discussed herein

FIG. 12 illustrates components of a machine 1200, according to some example embodiments, that is able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system and within which instructions 1224 (e.g., software) for causing the machine 1200 to perform any one or more of the methodologies discussed herein may be executed. In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a peer-to-peer (or distributed) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224 (sequentially or otherwise) that specify actions to be taken by that machine. Further, while only a single machine is illustrated, the term "machine" shall also be taken to include a collection of machines that individually or jointly execute the instructions 1224 to perform any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a liquid crystal display (LCD), a projector, or a cathode ray tube (CRT)). The machine 1200 may also include an alphanumeric input device 1212 (e.g., a keyboard), a cursor control device 1214 (e.g., a mouse, a touchpad, a trackball, a joystick, a motion sensor, or other pointing instrument), a storage unit 1216, a signal generation device 1218 (e.g., a speaker), and a network interface device 1220.

The storage unit 1216 includes a machine-readable medium 1222 on which is stored the instructions 1224 (e.g., software) embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1226 (e.g., network 190) via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., software) for execution by the machine, such that the instructions, when executed by one or more processors of the machine (e.g., processor 1202), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The invention claimed is:

1. A computer-implemented method comprising:
capturing, by a first client device, an image of an item;
associating the image with information usable to direct an electronic communication to the first client device;
providing the image, the associated information usable to direct the electronic communication, and a textual descriptor of the item to a server accessible by a second client device, wherein the textual descriptor of the item is provided at the second client device in response to a request from the second client device, and wherein the request is based on the second client device initially displaying only the image of the item; and
receiving, at the first client device, an electronic communication from the second client device regarding the image based on the information usable to direct the electronic communication to the first client device that is associated with the image.

2. The computer-implemented method of claim 1, wherein, based on the textual descriptor, the server provides a tag for the image, the tag being usable by the second client device to identify the image and the information usable to direct the electronic communication.

3. The computer-implemented method of claim 2, wherein the tag for the image is selected by the server from a predefined list.

4. The computer-implemented method of claim 1, further comprising generating location information indicating a location of the first client device, wherein the electronic communication is received at the first client device further based on the location of the first client device.

5. The computer-implemented method of claim 4, wherein the electronic communication is received at the first client device further based on the location of the first client device relative to a location of the second client device.

6. The computer-implemented method of claim 1, further comprising associating location information indicating a location of the first client device with the image and providing the image with the associated location information to the server, wherein the first client device generates the location information using triangulation.

7. A machine-readable storage medium embodying instructions that, when executed by a machine, cause the machine to perform operations, the operations comprising:
capturing, by a first client device, an image of an item;
associating the image of the item with information usable to direct an electronic communication to the first client device;
providing the image, the associated information usable to direct the electronic communication, and a textual descriptor of the item to a server accessible by a second client device, wherein the textual descriptor of the item is provided at the second client device in response to a request from the second client device, and wherein the request is based on the second client device initially displaying only the image of the item; and
receiving, at the first client device, an electronic communication from the second client device regarding the image based on the information usable to direct the electronic communication to the first client device that is associated with the image.

8. The machine-readable medium of claim 7, wherein, based on the textual descriptor, the server provides a tag for the image, the tag being usable by the second client device to identify the image and the information usable to direct the electronic communication.

9. The machine-readable medium of claim 8, wherein the tag for the image is selected by the server from a predefined list.

10. The machine-readable medium of claim 7, further comprising generating location information indicating a location of the first client device, wherein the electronic communication is received at the first client device further based on the location of the first client device.

11. The machine-readable medium of claim 10, wherein the electronic communication is received at the first client device further based on the location of the first client device relative to a location of the second client device.

12. The machine-readable medium of claim 7, further comprising associating location information indicating a location of the first client device with the image and providing the image with the associated location information to the server, wherein the first client device generates the location information using triangulation.

13. A client device comprising:
a camera;
one or more processors; and
one or more machine-readable storage media storing instructions that, when used by the one or more processors, cause the one or more processors to:
capturing, at the client device, an image of an item using the camera;
associating the image with information usable to direct an electronic communication to the client device;
providing the image, the associated information usable to direct the electronic communication, and a textual descriptor of the item to a server accessible by a second client device, wherein the textual descriptor of the item is provided at the second client device in response to a request from the second client device, and wherein the request is based on the second client device initially displaying only the image of the item; and
receiving, at the client device, an electronic communication from the second client device regarding the image based on the information usable to direct the electronic communication to the client device that is associated with the image.

14. The client device of claim 13, wherein, based on the textual descriptor, the server provides a tag for the image, the tag being usable by the second client device to identify the image and the information usable to direct the electronic communication.

15. The client device of claim 13, further comprising generating location information indicating a location of the client device, wherein the electronic communication is received at the client device further based on the location of the client device.

16. The client device of claim 15, wherein the electronic communication is received at the client device further based on the location of the client device relative to a location of the second client device.

17. The client device of claim 13, further comprising associating location information indicating a location of the client device with the image and providing the image with the associated location information to the server, wherein the client device generates the location information using triangulation.

* * * * *